Figure 1:
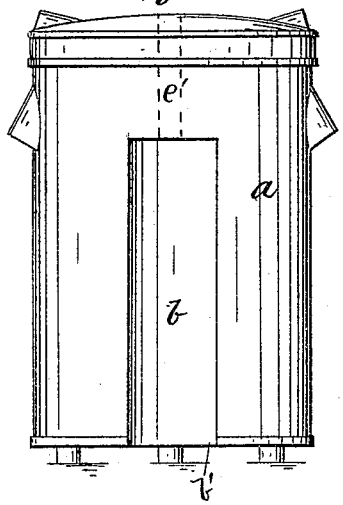

(No Model.)

W. M. HANEY.
MILK COOLER.

No. 249,041.

Patented Nov. 1, 1881.

Witnesses:
M. M. Lacey
A. Parker

Inventor
William M. Haney
By R. S. & A. P. Lacey, Attys.

UNITED STATES PATENT OFFICE.

WILLIAM M. HANEY, OF BELLEVUE, IOWA.

MILK-COOLER.

SPECIFICATION forming part of Letters Patent No. 249,041, dated November 1, 1881.

Application filed April 30, 1881. (No model.)

*To all whom it may concern:*

Be it known that I, WILLIAM M. HANEY, a citizen of the United States, residing at Bellevue, in the county of Jackson and State of Iowa, have invented certain new and useful Improvements in Milk-Cans; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of deep milk-cans which are provided with various appliances for cooling the milk rapidly; and its object is to furnish a can by which the milk will receive the benefits of rapid cooling at all points and in such degree as to accomplish the greatest possible results.

It is well known that cream rises better in deep than in shallow extended cans; but to obtain the best results from the deep body of milk it is necessary that the heat contained in the latter be rapidly expelled. In the large body of milk contained in a deep can the heat will escape very slowly unless artificial cooling processes be resorted to. If the heat be permitted to remain, a deterioration known as "rot," soon sets in at the central portion of the milk. My invention has for its special object to completely obviate this center rot by the lowering of the temperature of the milk in the shortest possible time. Various expedients have been resorted to to prevent this central deterioration of the body of the milk. Cans have been made and provided with central vertical tubes of uniform diameter; but these have failed because they did not have sufficient cooling-surface in the lower portions of the cans, where the heat of the milk is longest held. The common round or rectangular shallow pan, when made of long diameter, gives large cooling-surface by extending the body of the milk over a great superficial area and providing an extended surface on the periphery on the outside of the pan. This applies the cooling processes to points where there were already sufficient cooling-surfaces before any such superficial extensions were made, while the shallowness of the milk is inimical to the best results in the production of cream. Shallow pans have also been made rectangular in form with sides flaring outward, and provided with a semi-cylindrical tube open at one end and extended part way across the bottom, with a view to increasing the cooling surface uniformly at the bottom. Such construction is not adapted to cooling a large body of milk in a deep can. The cooling process will be done unequally, for some portions of the milk will be farther away than others from the cooling-surfaces, and the heat will be too long retained and the deterioration of the milk will commence.

To overcome all these objections is the object of my invention.

I employ the ordinary cylindrical can with vertical sides, and so constructed that it may be easily handled and set in any desired place. This can is provided with an inner tube or hollow shell small or narrow in its diameter at its top, and gradually enlarging as it extends downward through those portions of the milk in which the deterioration of center rot takes place till it reaches the bottom of the can. This shell is placed so that it sits over the center of the can, and it is extended laterally to the vertical side of the can. The wings which form the lateral extension converge as they extend outward to the wall of the can. The upper end of the shell is quite small, for at point where it ends there is already sufficient cooling facilities in the surrounding can and the exposed surface of the milk. The upper end is also extended outward until it reaches and is attached to the side of the can. This shell is conical in form and open at its bottom and side, so that it readily fills with water when the can is set down in a reservoir or tank.

Figure 2:
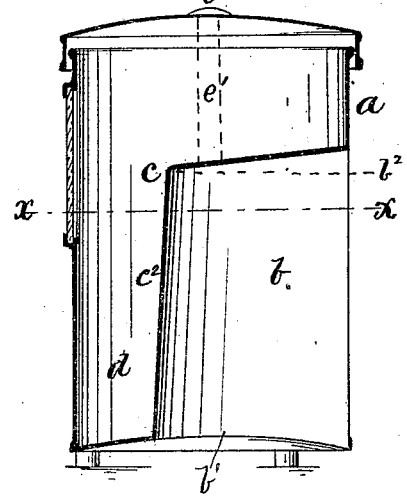
Figure 3:
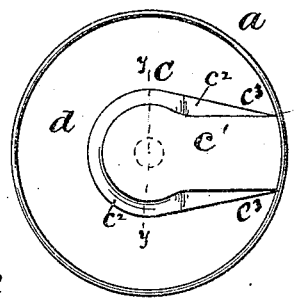
Figure 4:
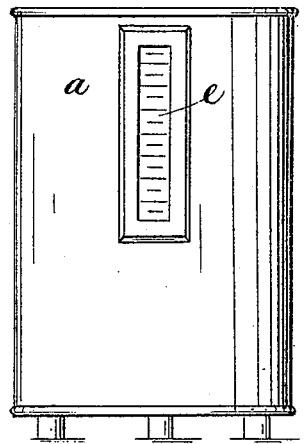
Figure 5:
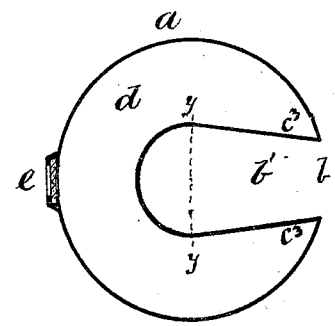

In the drawings, Figures 1 and 4 are side elevations. Fig. 2 is a vertical section. Fig. 3 is a plan with the lid removed, and Fig. 5 is a cross-section on line $x$ $x$, Fig. 2.

$a$ is the deep cylindrical can, made deep enough to contain the usual quantity of milk put in the ordinary deep cans employed in dairies.

$c$ is the tube or shell, which is placed within and around the center of the can. It is made small at its upper end and gradually increases in diameter as it extends downward to the bottom of the can. The inner portion of this casing immediately surrounding the vertical center of the can is formed in a circle concentric with the circle described by the wall of said can, so that the milk-chamber $d$ has a uniform horizontal depth on any given plane, except that the extremities of said chamber between the can and the wings of the shell are gradually drawn to a sharp point, as shown. The wings or ends $c^3\ c^3$ of the wall of the shell are not united together, but are extended laterally to the side of the can. The wings converge or are inclined gradually toward each other as they extend outward, so as to gradually diminish the space or water capacity between them. The upper end of the shell, as will be seen, is quite small, and is closed and so formed as to give it an upward inclination from the center to the wall of the can. The shell is open at its lower end and at the side, so that the water will readily pass upward and outward, as hereinafter explained.

The water-chamber $b$, which is provided by the placing of the shell $c$ in the can $a$, is large in its capacity or extent at the point level with lower end of the milk-chamber $d$, and gradually diminishes in capacity to the top of the shell. At the lower end and in the center of the can, where the deterioration of the milk first takes place, it will be seen that I have provided an extended cooling-surface, cooled by a large body of water. Farther toward the top, where the milk is less liable to deteriorate, and where less cooling appliances are required, the cooling-surface and water capacity diminishes and the milk-containing capacity increases.

The top $c'$ of the shell is inclined upward, as shown, so as to provide against any retention of air-bubbles within the shell and to facilitate the circulation of the water caused by being heated by the milk. It is very important, when water is used as the cooling element, that no air shall be retained next the wall of the can. If the top $c'$ were carried horizontally, more or less air-bubbles would be held by the water below the said top. This retained air could only be got rid of by tilting the can to one side. In addition to this, the upward slope of the top aids in giving circulation to the water. The smaller body of water contained in the upper and smaller end of the shell, being surrounded by the larger body of milk, is first heated and passes through the upwardly-inclined passage-way provided by the inclined top $c'$, and the colder water at once takes its place, and thus the circulation is kept up.

By the construction of a can as hereinbefore described many advantages over the ordinary cans are secured. The lower and central portions of the milk are cooled as rapidly or more rapidly than the upper portions, and thereby all deterioration by the retention of animal heat is obviated. A more rapid change or circulation of the cooling material, whether air or water, is secured by having the upper part of the cooling-chamber made smaller and surrounded by a larger body of milk.

The can may be provided with a central tube, (shown in dotted lines,) $e'$, extended upward from the top of the shell $c$; but I employ this tube only in cans which are specially constructed to be submerged in water. Where the can is not submerged the upward-inclined top $c'$ answers all needs for circulation, &c.

It will be seen that the inner shell, $c$, is surrounded by the circular wall of the can, with the exception of the slight break on one side, made necessary to provide the opening in the side of the shell.

Having thus described my invention, what I claim, and desire to secure by Letters Patent, is—

The cylindrical milk-can having in one side the vertical recess extending about two-thirds the way up from the bottom, and having a rounded back and an upwardly-inclined top, substantially as set forth.

In testimony whereof I affix my signature in presence of two witnesses.

WILLIAM M. HANEY.

Witnesses:
 WM. G. STUART,
 R. E. SLATTERY.